United States Patent Office.

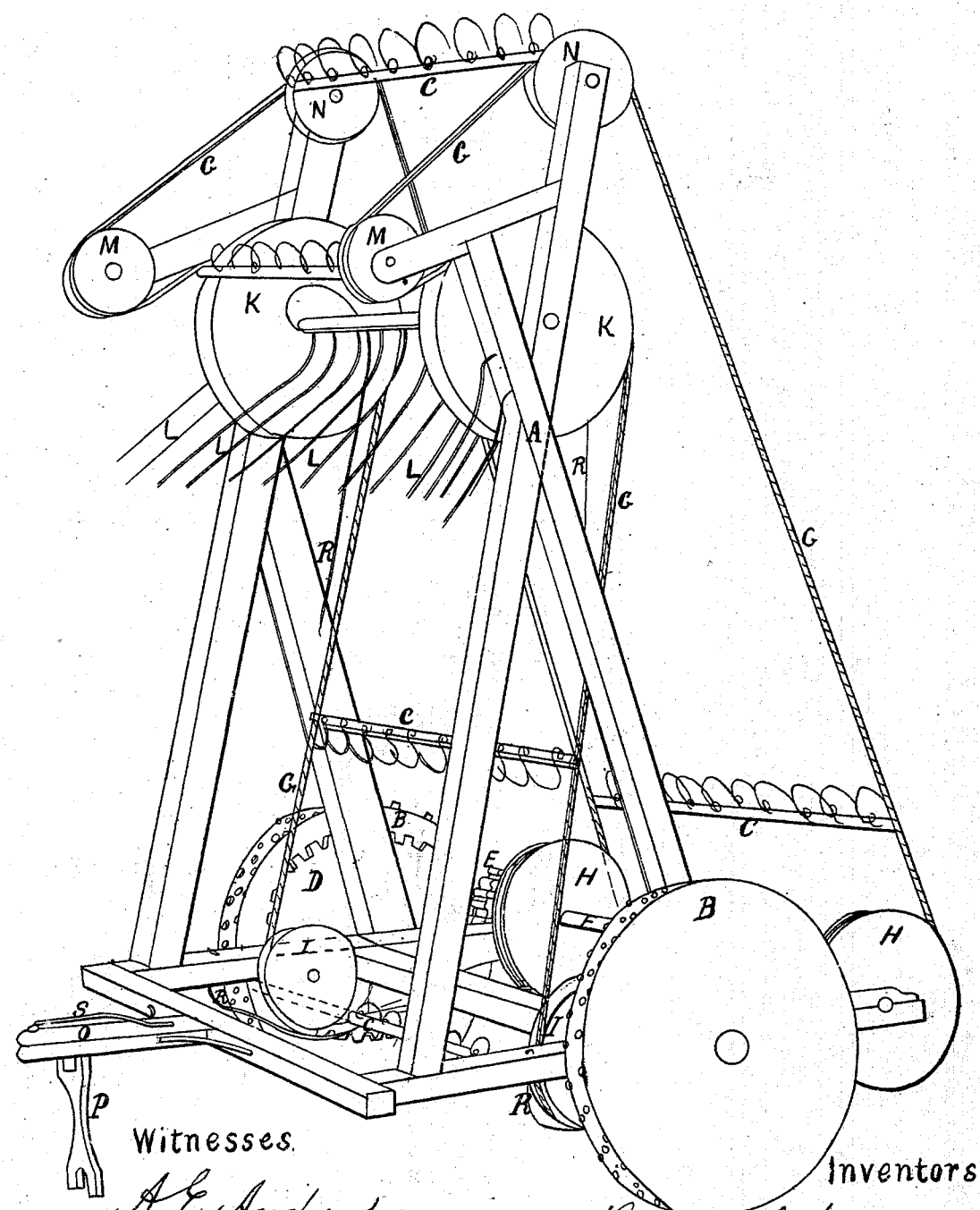

NORMAN S. KINYON AND BENJAMIN F. SMITH, OF CHENANGO FORKS, NEW YORK.

*Letters Patent No. 68,887, dated September 17, 1867.*

IMPROVEMENT IN HAY-RAKERS AND LOADERS.

*The Schedule referred to in these Letters Patent and making part of the same.*

TO ALL WHOM IT MAY CONCERN:

Be it known that we, NORMAN S. KINYON and BENJAMIN F. SMITH, of Chenango Forks, in the county of Broome, and State of New York, have invented a new and useful Improvement on a Machine for Raking and Loading Hay; and we hereby declare that the following is a full, clear, and exact description of the construction and operation of the same, reference being had to the annexed drawings, making a part of this specification, in which—

Figure 1 is a perspective view, representing the machine in all its parts in a manner sufficient to explain our improvement.

Our invention consists in the construction and combination of several devices for operating a hay-rake and loading machine, for the purpose of making it more efficient in its operation and less complicated in its construction. We construct our improvement of the material used for similar purposes.

The frame A is of a triangular form, of sufficient height to elevate the hay to the top of a full load, mounted on wheels B B, which operate the rakes C C C by means of the gear-wheel D attached to the inside of one of the driving-wheels B, and the pinion E on the end of the pulley-shaft F, and the band or belt G G, to which the rakes are attached. Said band gives the proper direction to the rakes by means of pulleys attached to different parts of the frame. The rakes are guided horizontally the proper distance under the frame by the pulleys H H and I I. They are then carried up and pass over the pulleys K K for the purpose of discharging the hay on to the guide-teeth L L L L, from which it slides into the wagon. The direction of the rakes is then changed by passing over the pulleys M M and N N, which are attached to the top of the frame. For the purpose of readily detaching the bands from the pulleys we connect them by means of a clasp, so that when moving to or from the place of operation, the wheels B B can be used only for that purpose. We attach to the base of the frame A a tongue, O, and spring-bolt, by which means the machine is connected to the wagon. On the under side of this tongue we attach a hinged standard, P, so that when the machine is detached from the wagon it will support it in an upright position. In the stationary shaft or axle of the pulleys K K we attach wire teeth L L L L, of sufficient length, extending downward, thereby forming an inclined plane to conduct the hay to the wagon. To prevent the hay from working into the gearing and pulleys we attach wire guards R R R R at the points where the loaded rakes pass. When we use our improvement we attach it to the wagon, which has a hole prepared near the rear end to receive the bolt, which is secured in its position by the springs. The connecting tongue O is made the proper length to bring the machine to the right distance from the wagon to receive the hay.

In the operation of raking and loading the rakes follow each other in such close connection that all the hay is deposited in the wagon, and the load is made up by the tender.

We are aware that there are machines for raking and loading hay that are in some respects similar to our improvement. Some of them are inseparably connected with the wagon, and consequently, as it passes over rough ground, is subjected to great lateral strain and derangement of the parts, while our improvement is so arranged that it passes over obstructions with much less difficulty, and no danger of derangement. It can be easily detached from the wagon and attached to another if found necessary, as it is independent in its operation. It can be manufactured at less expense, and is much less liable to get out of order than others now in use. We therefore disclaim all similar arrangements and combinations, confining ourselves to the novel features of our invention.

What we claim, and desire to secure by Letters Patent, is—

The inclined guide-teeth L L and the wire guards R R, in combination with the rake and elevating-teeth and the endless carrier, all being constructed and arranged substantially as set forth.

NORMAN S. KINYON,
BENJ. F. SMITH.

Witnesses:
B. N. LOOMIS,
E. B. STOCKING.